US010484090B2

(12) United States Patent
Saes et al.

(10) Patent No.: US 10,484,090 B2
(45) Date of Patent: Nov. 19, 2019

(54) METHOD FOR CHANGING THE IDENTIFICATION CODE OF A LIGHT SOURCE IN VISIBLE LIGHT COMMUNICATION SYSTEMS

(71) Applicant: ELDOLAB HOLDING B.V., Son en Breugel (NL)

(72) Inventors: Marc Saes, Eindhoven (NL); Stephen Haight Lydecker, Snellville, GA (US)

(73) Assignee: ELDOLAB HOLDING B.V., Eindhoven (NL)

( * ) Notice: Subject to any disclaimer, the term of this patent is extended or adjusted under 35 U.S.C. 154(b) by 0 days.

(21) Appl. No.: 15/571,655

(22) PCT Filed: May 3, 2016

(86) PCT No.: PCT/NL2016/050318
§ 371 (c)(1),
(2) Date: Nov. 3, 2017

(87) PCT Pub. No.: WO2016/178572
PCT Pub. Date: Nov. 10, 2016

(65) Prior Publication Data
US 2018/0145748 A1    May 24, 2018

(30) Foreign Application Priority Data
May 7, 2015   (NL) ..................... 2014776

(51) Int. Cl.
*H04B 10/00* (2013.01)
*H04B 10/116* (2013.01)
(Continued)

(52) U.S. Cl.
CPC ........... *H04B 10/116* (2013.01); *H04B 10/50* (2013.01); *H04B 10/60* (2013.01); *H05B 37/0272* (2013.01)

(58) Field of Classification Search
CPC .................................................. H04B 10/116
See application file for complete search history.

(56) References Cited

U.S. PATENT DOCUMENTS 9,287,977 B2 *  3/2016  Oshima ............... H04B 10/116
9,600,983 B1    3/2017  Lydecker et al.
(Continued)

FOREIGN PATENT DOCUMENTS

WO   2010116299 A1   10/2010
WO   2012093241 A1    7/2012

OTHER PUBLICATIONS

International Search Report issued in PCT/NL2016/050318, dated Sep. 28, 2016, 4 pages.
(Continued)

*Primary Examiner* — David C Payne
*Assistant Examiner* — Pranesh K Barua
(74) *Attorney, Agent, or Firm* — RatnerPrestia

(57) ABSTRACT

The invention relates to a method for changing the identification code of a light source in a visible light communication system, which visible light communication system comprises the light source, a driver system to drive the light source, and a server that is not able to communicate directly with the driver system, and which method makes use of a first mobile device comprising an image sensor, a processing unit, a network adapter, and a transmitter, wherein the processing unit is configured to process an output of the image sensor, wherein the processing unit is configured to communicate with the server via the network adapter, and wherein the processing unit is configured to send signals to the driver system using the transmitter, said method comprising the following steps: a. receiving a signal from the server by the network adapter of the first mobile device, said signal comprising a command to change the identification code of the light source from a first ID code to a second ID
(Continued)

Figure 1:
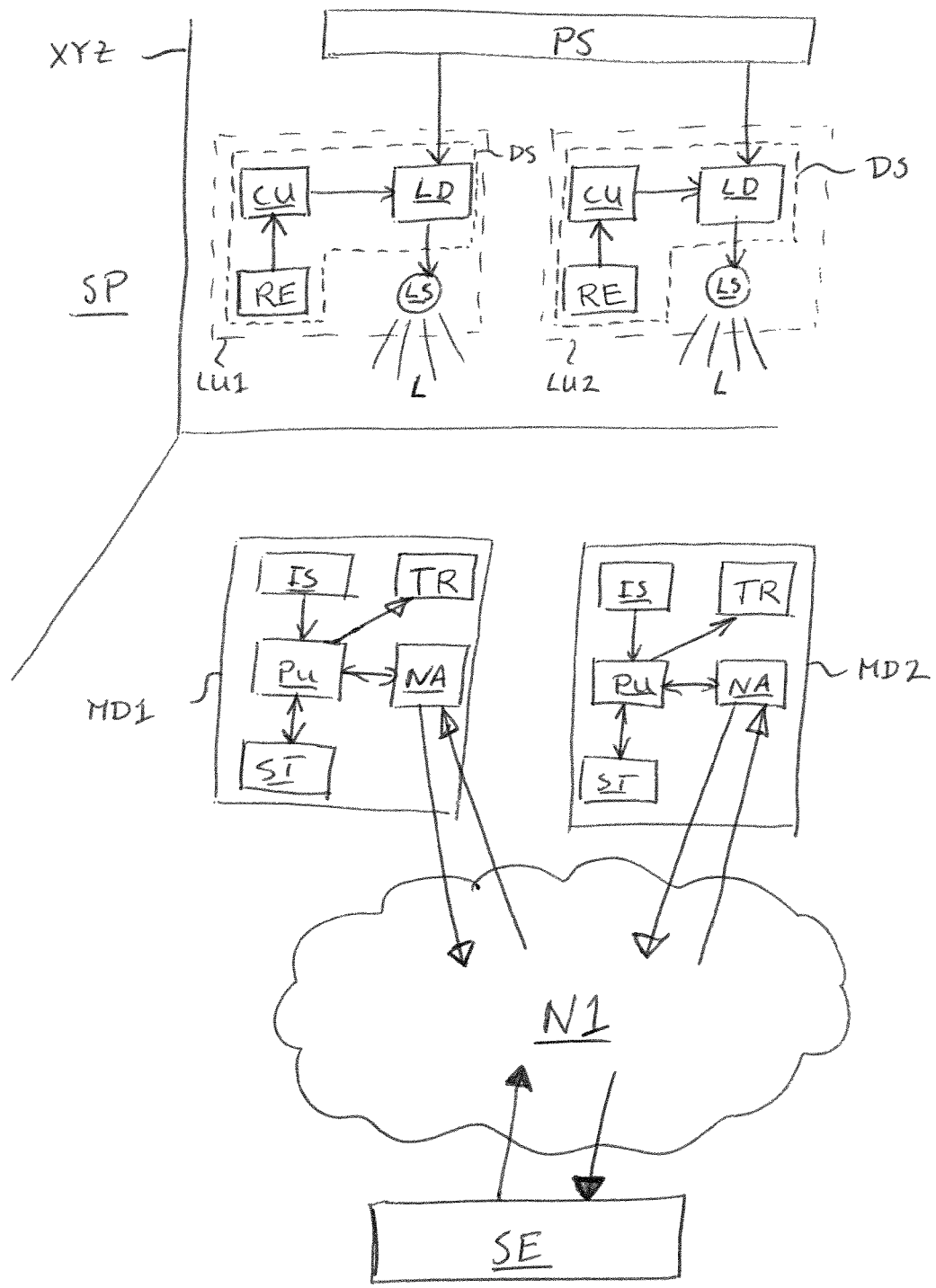

code; and b. transmitting, by the transmitter of the first mobile device, a signal to the driver system, said signal comprising a command to change the identification code of the light source to a second ID code.

17 Claims, 2 Drawing Sheets

(51) Int. Cl.
*H05B 37/02* (2006.01)
*H04B 10/50* (2013.01)
*H04B 10/60* (2013.01)

(56) References Cited

U.S. PATENT DOCUMENTS

| | | | | |
|---|---|---|---|---|
| 9,784,817 | B2 | 10/2017 | Lydecker et al. | |
| 2008/0310850 | A1* | 12/2008 | Pederson | G07C 9/00158 398/135 |
| 2011/0243570 | A1* | 10/2011 | Kim | H04B 10/114 398/140 |
| 2012/0091896 | A1* | 4/2012 | Schenk | H05B 37/0245 315/132 |
| 2013/0020947 | A1* | 1/2013 | Weaver | H05B 37/0272 315/151 |
| 2013/0141554 | A1* | 6/2013 | Ganick | G01S 1/70 348/61 |
| 2013/0163994 | A1* | 6/2013 | Iizuka | H04B 10/116 398/130 |
| 2013/0343762 | A1* | 12/2013 | Murayama | H04B 10/1141 398/130 |
| 2014/0023378 | A1* | 1/2014 | Bae | G06Q 30/02 398/128 |
| 2014/0143853 | A1* | 5/2014 | Onodera | H04L 63/20 726/14 |
| 2015/0003832 | A1* | 1/2015 | Yamasaki | H04B 10/116 398/115 |
| 2015/0147067 | A1* | 5/2015 | Ryan | H04B 10/116 398/118 |
| 2015/0207561 | A1* | 7/2015 | Shin | H04B 10/1149 398/118 |
| 2015/0373503 | A1* | 12/2015 | Jovicic | G01S 5/0252 455/456.1 |
| 2016/0156638 | A1* | 6/2016 | Somani | H04L 63/12 726/7 |
| 2018/0011167 | A1* | 1/2018 | Lydecker | G08B 5/36 |

OTHER PUBLICATIONS

International Search Report for NL Application No. 2014776 dated Jan. 12, 2016, 10 pages.
"Chapter 28: Multilateral approaches for reliable mobile RFID service systems" In: S.A. Ashon et al: "RFID Handbook," 2008, Taylor and Francis group, p. 513, 1 page.

* cited by examiner

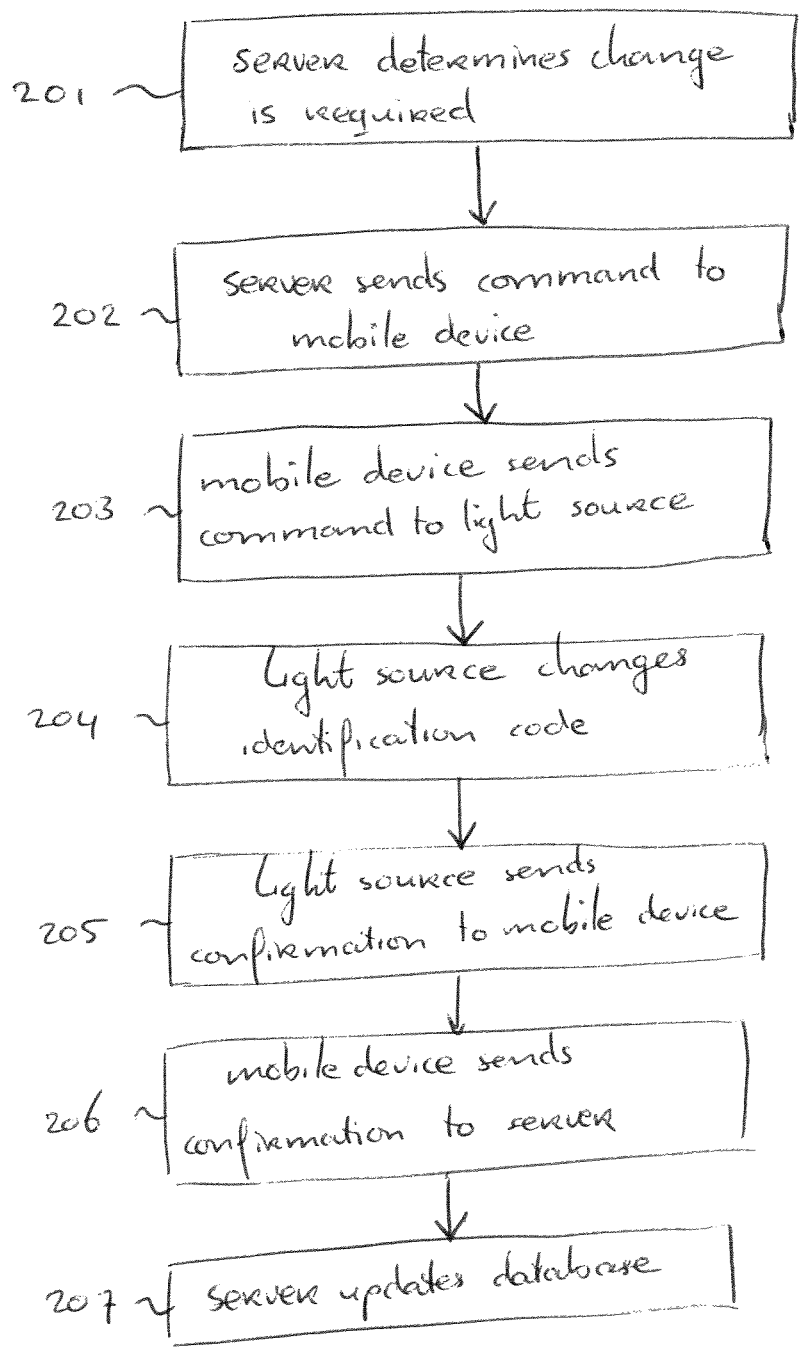

METHOD FOR CHANGING THE IDENTIFICATION CODE OF A LIGHT SOURCE IN VISIBLE LIGHT COMMUNICATION SYSTEMS

This application is a U.S. National Phase Patent Application of International Application No. PCT/NL2016/050318, filed May 3, 2016, which claims priority to Netherlands Application No. NL 2014776, filed May 7, 2015, the disclosures of which also are entirely incorporated herein by reference.

The invention relates to a method for changing the identification code of a light source in visible light communication systems.

Light sources are used everywhere to produce light. Examples are indoor/outdoor lamps, TVs, traffic signs, commercial displays, car headlights/taillights, etc. A code, i.e. digital information, may be incorporated into the emitted light by modulating the light source, i.e. turning them on and off. This principle may be referred to as Visible Light Communication or VLC. When the modulation is fast enough, i.e. turning the light source on and off is done rapidly, the incorporation of digital information into the emitted light is unperceivable to the human eye. Hence, VLC uses the phenomenon that if a frequency of an intermittent light stimulus is above a so-called flicker fusion threshold, the intermittent light stimulus appears to be completely steady to the average human observer.

In some cases it may also be important that the modulation is unperceivable for a technical observer, such as a television studio camera.

The digital information may be incorporated into the emitted light using different types of modulation, for instance amplitude modulation, in which the intensity is varied, frequency modulation, in which the frequency is varied, and phase modulation, in which the signal is shifted in time with respect to some reference clock.

The transmitted code in the modulated light may comprise an identification code which can e.g. be used to determine the position of a mobile device in a store. The mobile device therefore comprises an image sensor receiving the modulated light and a processing unit to obtain the identification code from the received signal. The identification code can be used to determine the position of the mobile device in order to provide position dependent content to the user of the mobile device or for navigating through a store.

The information to determine the position of the mobile device and the position dependent content may be preloaded onto the mobile device or may be available via a remote server communicating with the mobile device. In both situations, communication with the remote server is required, either because the information is preloaded from the server onto the mobile device (and preferably regularly updated) or because the information is only available through communication with the server.

When a static identification code for the light source is used as is for instance disclosed in US patent publication US2013/0029682 A1, the identification code may be obtained by third parties, which subsequently can use the identification code for their own applications. Such use of the light sources and corresponding identification codes may be undesired and rolling codes may be used as a security measure. When using rolling codes, the identification code of the light source is changed regularly, so that it is more difficult for third parties to use the identification codes of the light sources for their own applications as they have to keep up with the changes in identification codes, which is even more difficult when the number of light sources involved increases.

However, when using rolling codes it is important that both the server and the light source use the same code at the same time for flawless operation. However, in situations in which there is no direct communication between the light source and the server, rolling codes cannot be used as the light source and server are not able to synchronize the change of identification code.

Hence, it is an object of the invention to provide a VLC system in which it is more difficult for third parties to use the identification codes transmitted by light sources for their own purposes.

According to a first aspect of the invention, there is provided a method for changing the identification code of a light source in a visible light communication system, which visible light communication system comprises the light source, a driver system to drive the light source, and a server that is not able to communicate directly with the driver system, and which method makes use of a first mobile device comprising an image sensor, a processing unit, a network adapter, and a transmitter, wherein the processing unit is configured to process an output of the image sensor, wherein the processing unit is configured to communicate with the server via the network adapter, and wherein the processing unit is configured to send signals to the driver system using the transmitter, said method comprising the following steps:

a. receiving a signal from the server by the network adapter of the mobile device, said signal comprising a command to change the identification code of the light source from a first ID code to a second ID code; and
b. transmitting, by the transmitter of the mobile device, a signal to the driver system, said signal comprising a command to change the identification code of the light source to a second ID code.

The invention is based on the insight that the use of rolling codes is still possible in case the server is not able to communicate directly with the driver system by allowing communication between the driver system and a mobile device using the VLC system. As a result the identification codes emitted by the light sources can be changed regularly to make it more difficult for third parties to obtain the correct identification code for their own purposes. The method according to the first aspect of the invention relates to the steps that are taken by the mobile device in order to implement the insight of the inventors.

In an embodiment, the method further comprises the following steps:

c. receiving a confirmation signal from the driver system that the identification code of the light source successfully has been changed to the second ID code; and
d. transmitting a confirmation signal to the server that the identification code of the light source successfully has been changed to the second ID code.

By transmitting a confirmation signal to the server, the server is able to determine whether the change of identification code was successful and which identification code should be used from now on for this light source.

In an embodiment, the confirmation signal in step c. is received by the first mobile device, and transmitting the confirmation signal to the server in step d. is carried out by the network adapter of the first mobile device. This embodiment deals with the situation that the first mobile device is present long enough nearby the light source to be able to receive and transmit the confirmation signal. However, the first mobile device may during this process move away from the light source so that it is no longer able to receive and transmit the confirmation signal.

Hence, an embodiment is envisaged in which use is made of a second mobile device comprising an image sensor, a processing unit, a network adapter, and a transmitter, wherein the processing unit is configured to process an output of the image sensor, wherein the processing unit is configured to communicate with the server via the network adapter, and wherein the processing unit is configured to send signals to the driver system using the transmitter, which second mobile device receives the confirmation signal in step c. and transmits the confirmation signal to the server in step d. using its network adapter.

In an embodiment, the confirmation signal may simply be the broadcasting of the second identification code by the light source, and transmitting a confirmation signal to the server may simply be transmitting the second identification code to the server by the first or second mobile device as a for instance normal request for information about the location of the light source, so that the server recognizes the second identification code and concludes that the change of identification code was successful, because otherwise it could not have received the second identification code from a mobile device.

According to a second aspect of the invention, there is provided a driver system configured to drive a light source, the driver system comprising:
 a control unit; and
 a light driver,
wherein the light driver is configured to convert energy provided by a power source into a form suitable for the light source, and wherein the control unit is configured to control the light driver such that the light source emits modulated light comprising at least an identification code, wherein the driver system further comprises a receiver to receive signals from nearby mobile devices, and wherein the control unit is further configured to change the identification code from a first ID code to a second ID code upon receiving a signal by the receiver of the driver system, said signal comprising a command to change the identification code of the light source.

The second aspect of the invention relates to the changes made to the driver system in order to implement the insight of the inventors. In order to be able to receive signals from mobile devices, the driver system needs to comprise a receiver for this purpose and the control unit needs to be configured to process the received signals. As a result, the driver system is able to change its identification code emitted using the light source, so that it is more difficult for third parties to obtain the correct identification code for their own purposes.

In an embodiment, the control unit is further configured to transmit a confirmation signal using modulation of the light source after successfully changing the identification code of the light source. Alternatively, the confirmation signal may be sent by a separate transmitter of the driver system.

According to a third aspect of the invention, there is provided a visible light communication system, comprising:
 a light source;
 a driver system;
 a server; and
 a mobile device,
wherein the driver system is configured to drive the light source such that the light source emits a modulated light comprising at least an identification code associated with the light source, wherein the mobile device is configured to receive the identification code from the light source to identify the light source, wherein the server is configured to allow the mobile device to identify the light source, wherein the server is further configured to initiate the change of the identification code of the light source by sending a corresponding command to the mobile device, and to change the identification code of the light source upon receiving of a confirmation thereof from the mobile device, wherein the mobile device is further configured to receive said command from the server, to relay the command to the driver system, to receive a confirmation of the change from the driver system, and to relay the confirmation to the server, and wherein the driver system is further configured to receive said command from the mobile device, to change the identification code accordingly, and to send a confirmation thereof to the mobile device.

According to a fourth aspect, there is provided a visible light communication system, comprising:
 a light source;
 a driver system;
 a server; and
 a mobile device,
wherein the driver system is configured to drive the light source such that the light source emits a modulated light comprising at least an identification code associated with the light source, wherein the mobile device is configured to receive the identification code from the light source to identify the light source, wherein the server is configured to allow the mobile device to identify the light source, wherein the driver system comprises a sequence of different identification codes and a time table indicating when to change the identification code of the light source to a next identification code in the sequence, wherein the server comprises the same sequence of different identification codes and time table as stored in the driver system, and wherein the server and driver system are synchronized to simultaneously change the identification code of the light source according to the sequence of different identification codes and the time table.

It is explicitly noted here that the phrase 'identification code of the light source" may also comprise the meaning or be understood as being the identification code associated with the light source.

The invention will now be described by reference to the accompanying drawings in which like parts are indicated by like reference symbols and in which:

FIG. 1 schematically depicts a visual light communication system according to an embodiment of the invention; and FIG. 2 schematically depicts a flowchart of a process of changing the identification code of a light source in a VLC system according to an embodiment of the invention.

FIG. 1 schematically depicts a visual light communication (VLC) system according to an embodiment of the invention. A space SP is shown schematically using 3D co-ordinate system XYZ.

Provided in the space are in this example two luminaires LU1 and LU2, each comprising a driver system DS and a light source LS to emit light L. Usually the luminaires are arranged overhead to effectively illuminate the space SP.

In the example in FIG. 1, the luminaires LU1, LU2 are connected to a power source PS, here embodied as a single mains, to draw energy therefrom, but the power source may also be a battery or for instance a solar panel. Hence, power can be provided externally or internally.

The driver system DS is configured to drive the corresponding light source LS and therefore comprises a light driver LD configured to convert the power provided by the power source PS into a suitable form to be provided to the light source LS, and a control unit CU to control the light driver LD.

When the control unit CU would control the light driver LD in a traditional manner, the light source LS emits light L with a constant intensity level or the light source LS is modulated at a fixed frequency resulting in an average intensity level, wherein the control unit sets the constant or average intensity level of the emitted light L. The fixed frequency is then preferably high enough to be unperceivable by a human observer or a technical observer such as a TV studio camera, e.g. above 120 Hz, preferably above 150 Hz and more preferably above 200 Hz. For the technical observer, the frequency is preferably above their maximum observable frequency.

However, in a VLC system the control unit CU controls the light driver LD such that the emitted light L comprises at least an identification code associated with the light source LS, i.e. associated with either one of the luminaires LU1, LU2. Incorporating a code into the emitted light L can be done by varying the modulation of the light source LS. For instance, the modulation frequency may be varied between high frequency and a low frequency, wherein the low frequency represents a digital zero or "0" and the high frequency represents a digital one or "1", so that a binary code may be obtained and broadcasted by the luminaires by appropriate switching between the low and high modulation frequency or symbols can be constructed from the pulses with different overall width and different ON and OFF times.

In VLC systems, the by the light source LS emitted light L including the code is intended to be received by electronic apparatuses such as a first mobile device MD1 and a second mobile device MD2. The first and second mobile device MD1, MD2 may be a smart phone, tablet or any other electronic device that can easily be handled by a person while walking through the space SP.

The first mobile device MD1 and the second mobile device MD2 each comprise an image sensor IS, for instance in the form of a camera or any other optical detection device capable of receiving the emitted light L from the light sources LS and allowing to determine the code contained in the emitted light L. A known mechanism is to use a roller-shutter mechanism converting the emitted light in an image of dark and bright lines that can be processed by a processing unit PU of the mobile devices MD1, MD2 to determine the code contained in the image.

Once the identification code is determined by the mobile device, this identification code can be used to identify the light source, to obtain corresponding information and to present the information to the user of the mobile device. The coupling between information and identification code is stored on a server SE, so that communication between the server SE and the mobile device MD1, MD2 is required in order to provide the information after the identification code has been received from the luminaire LU1, LU2.

The communication between server SE and mobile device MD1, MD2 may be established directly after obtaining the identification code by sending the identification code to the server SE over a network N1 using a network adapter NA of the corresponding mobile device MD1, MD2. In return, the server SE provides information to the mobile device MD1, MD2, again over the network N1 via the network adapter NA, so that the mobile device can use this information in its interaction with the user, e.g. by displaying information to the user.

The network N1 can be Wifi, Bluetooth, etc.

However, it is also possible that the mobile device MD1, MD2 has established contact with the server at an earlier stage, e.g. when downloading a corresponding application or running an update thereof, in which the information and the coupling to the identification code was downloaded from the server SE, so that when obtaining the identification code from the light source, no communication with the server is required at that moment, but the information to be used can be retrieved from a storage ST.

FIG. 1 depicts a situation in which the server SE is not in direct contact with the luminaires LU1, LU2. This means that server SE is not able to communicate directly or via network N1 with the luminaires LU1, LU2 using permanently available components in the VLC system. It is not excluded that the luminaires LU1, LU2 form a network or are part of a network enabling them to communicate with each other, as long as this network is not accessible by the server SE directly or via network N1. The mobile devices MD1, MD2 are not considered permanently available components, because they are not always near the luminaires and thus cannot be used by the server to communicate with the luminaires at all time.

In the prior art, a drawback of no direct contact between server SE and luminaires LU1, LU2 is that rolling codes, i.e. regularly changing identification code, cannot be used as a security measure, as it is not possible for the server SE to communicate with the luminaires LU1, LU2.

However, as will be shown below, with the VLC system according to the invention, it is possible to use rolling codes by using one or more of the mobile devices MD1, MD2.

The process of changing identification code will be described by reference to FIGS. 1 and 2, where FIG. 2 depicts a flowchart of the process and the VLC system is used as a practical example of how this process can be carried out.

The process starts with a fully operational and functional VLC system, wherein light sources have been assigned corresponding identification codes, and the server and mobile devices are able to process information coupled to these identification codes. In order to make it harder for third parties to make use of the identification codes broadcasted by the light sources e.g. by coupling their own information to the identification codes and offer this to customers, the identification code of a light source should be changed to another identification code.

This change is determined by the server in step 201. This determination may be based on a time rule, e.g. based on the fact that the identification code of the light source has not been changed for a predetermined amount of time. However, the determination may also be random, for instance by randomly picking a light source every hour/day/etc.

In the VLC system of FIG. 1, the server SE determines that the identification code of a light source LS of luminaire LU1, LU2 should change for security reasons. In the remainder below, it is assumed that the light source LS of the first luminaire LU1 currently broadcasts a first identification code and that the server SE has determined that the first identification code should be changed to a second identification code different from the first identification code.

Once it is determined that a light source needs to change identification code, the server will send a command to a mobile device in step 202. In other words, the server will send a signal to a mobile device and the mobile device will receive said signal, wherein said signal comprises a command to change the identification code of a specific light source from a first ID code to a second ID code.

How and when the command is send may depend on the type of VLC system being used. As indicated above, the coupling between information and identification code may be preloaded onto the mobile device, so that the mobile device is able to function without requiring contact with the server. Contact is then only required in case of changes. This embodiment will be referred to as the preload embodiment.

In another embodiment, which will be referred to as non-preload embodiment, the coupling between information and identification code is not preloaded onto the mobile device, but the mobile device is regularly contacting the server to obtain the necessary information.

In the preload embodiment, it is preferred that the server pushes the command to a mobile device, where in the non-preload embodiment, it may be preferred to let the server wait for an information request from a mobile device relating to the to be changed identification code before the command is sent to said mobile device.

In the preload embodiment, it is further preferred that the command is sent to multiple mobile devices simultaneously, because it is not known which mobile device is near or will be near the light source in the near future. By sending the command to multiple mobile device, the chance of a mobile device being near a light source, currently or in the near future, is increased, thereby aiding in quickly changing the identification code.

In case the light sources are forming or part of a network allowing communication between the different luminaires of the VLC system, being near the light source having to change the identification code is not required. Hence, in the non-preload embodiment, the server may send the command to a mobile device upon a request for information relating to an identification code which does not have to be changed, but which is within the network of light sources.

In an example with respect to FIG. 1, it may be the case that a user enters the space SP with the first mobile device MD1 in hand so that upon approaching the first luminaire LU1, the image sensor IS of the first mobile device MD1 receives the emitted light L from the first luminaire LU1, which is processed by the processing unit PU of the first mobile device MD1 to obtain a first identification code. This first identification code may then be sent to the server SE as a request for information.

The server SE upon receiving the first identification code will check whether the corresponding luminaire LU1, i.e. the corresponding light source LS thereof needs to change identification code. If this is the case, the server SE will send a signal comprising a command to change the identification code of the light source from a first ID code to a second ID code to the first mobile device MD1.

After sending the command to one or more of the mobile devices, the one or more mobile devices will send the command to the appropriate light source whenever possible as depicted in step 203. Depending on the configuration of the multiple light sources, the one or more mobile devices will send the command directly to the light source or via another light source within the network connecting the multiple light sources.

In order to be able to send the command to a light source, the mobile device has to be equipped with a transmitter to send a signal comprising the command to the light source, and the light source needs to be equipped with a receiver to receive the signal including command for processing.

Examples thereof are shown in FIG. 1. The first and second mobile devices MD1, MD2 each comprise a transmitter TR configured to send a signal including command to a light source. The driver systems DS of the first and second luminaire LU1, LU2 each comprise a receiver RE for receiving said signal from a mobile device.

The transmitter TR of the mobile device is preferably a transmitter commonly used in mobile device and may be an RF transmitter, WIFI transmitter, Bluetooth transmitter, IR transmitter or the like. It is also possible that light is being used as a transmitter, either using a display of the mobile device or a separate light source as transmitter. The same applies to the use of sound. The receiver RE of the luminaires is configured to receive the transmitted signal and may thus be an RF receiver, WIFI receiver, Bluetooth receiver, IR receiver or an image sensor or microphone.

After receiving the command from a mobile device, the control unit CU of the driver systems DS will process said command and change the identification code from a first ID to a second ID in step 204.

In step 205, the light source sends a confirmation of the successful change of identification code to a mobile device. This does not necessarily have to be the same mobile device which sent the command to the light source in the first place. Further, the confirmation does not have to be a distinct confirmation signal. It may well be in the example of FIG. 1, that the first mobile device MD1 has sent the command to the first luminaire LU1, and that after successfully changing the identification code the first luminaire is simply used to broadcast a signal but now including the new identification code, and that the second mobile device MD2 gets near the first luminaire LU1 and receives the new identification code.

In a non-preload configuration, the second mobile device MD2 will send the new identification code to the server SE in step 206, which to the server acts as a confirmation that the change of identification code was successful, so that the server SE can update its records in step 207.

It is noted that in some situations described above, a mobile device may receive a command to change identification code of a light source, but is not able to relay this to the light source, e.g. because it is out of reach of the light source. To prevent that the mobile device keeps the command 'forever' in its memory, the command may have a 'maximum age' after which it is removed, and/or the command may be removed after communication with the light source or associated network and the determination that the command is no longer applicable, and/or the command may be removed after communication with another visible light communication system using a light source with the same identification code.

In an alternative embodiment, the command may be removed once communication with the light is no longer possible.

The invention claimed is:

1. A method for changing an identification code of a light source in a visible light communication system, which visible light communication system comprises the light source, a driver system to drive the light source, and a server that is not able to communicate directly with the driver system, and which method makes use of a first mobile device comprising an image sensor, a processing unit, a network adapter, and a transmitter, wherein the processing unit is configured to process an output of the image sensor, wherein the processing unit is configured to communicate with the server via the network adapter, and wherein the processing unit is configured to send signals to the driver system using the transmitter, said method comprising the following steps:

a. determining, by the server, a timing of a change in the identification code of the light source to change from a first ID code to a second ID code and transmitting by the server, in response to the determination, a first signal to the network adapter of the first mobile device, the first signal comprising a command to change the identification code of the light source from the first ID code to the second ID code;

b. receiving the first signal from the server by the network adapter of the first mobile device, the first signal comprising the command to change the identification code of the light source from the first ID code to the second ID code; and c. transmitting, by the transmitter of the first mobile device, a second signal to the driver system for the light source, said second signal comprising a command to implement the change of the identification code of the light source to the second ID code, after the network adapter of the first mobile device receives from the server the first signal comprising the command to change the identification code of the light source from the first ID code to the second ID code.

2. The method according to claim 1, further comprising the following steps:

d. receiving a confirmation signal from the driver system when the identification code of the light source has been successfully changed to the second ID code; and e. transmitting a confirmation signal to the server that the identification code of the light source successfully has been changed to the second ID code.

3. The method according to claim 2, wherein the confirmation signal in step d. is received by the first mobile device, and wherein transmitting the confirmation signal to the server in step e. is carried out by the network adapter of the first mobile device.

4. The method according to claim 2, wherein use is made of a second mobile device comprising an image sensor, a processing unit, a network adapter, and a transmitter, wherein the processing unit is configured to process an output of the image sensor, wherein the processing unit is configured to communicate with the server via the network adapter, and wherein the processing unit is configured to send signals to the driver system using the transmitter, wherein the confirmation signal in step d. is received by the second mobile device, and wherein transmitting the confirmation signal to the server in step d. is carried out by the network adapter of the second mobile device.

5. The method according to claim 1, wherein the server transmits, in step a, the first signal comprising the command to change the identification code of the light source from the first ID code to the second ID code to at least two mobile devices, wherein a first one of the at least two mobile devices that establishes a connection with the light source after receiving the first signal comprising the command to change the identification code of the light source from the first ID code to the second ID code is the first mobile device, and transmits to the light source the second signal comprising the command to change the identification code of the light source from the first ID code to the second ID code.

6. The method according to claim 5, wherein the at least two mobile devices include at least one of a smart phone, tablet or electronic device of a user that may move through a space illuminated by the light source.

7. The method according to claim 1, wherein information relating to the light source and a coupling between the second ID code and the light source are stored on the server, wherein the information relating to the light source is sent by the server to the first mobile device, and wherein, in response to the first mobile device receiving the second ID code from the light source, the light source is identified by means of the second ID code, and the information relating to the light source is used by the first mobile device for interaction with the user of the first mobile device.

8. The method according to claim 7, wherein the information relating to the light source and associated with the second ID code is transmitted by the server to the first mobile device in response to the first mobile device receiving, from the light source, the second ID code and the first mobile device requesting the server to send the information relating to the light source and associated with the second ID code.

9. The method according to claim 7, wherein the information relating to the light source and associated with the second ID code is loaded by the server into the first mobile device, prior to the first mobile device receiving, from the light source, the second ID code.

10. A driver system configured to drive a light source, the driver system comprising:

a control unit;

a light driver, wherein the light driver is configured to convert energy provided by a power source into a form suitable for the light source, and wherein the control unit is configured to control the light driver such that the light source emits modulated light comprising at least an identification code; and a receiver arranged to receive signals from nearby mobile devices, wherein the control unit is further configured to change the identification code from a first ID code to a second ID code upon receiving from one of the nearby mobile devices a second signal by the receiver of the driver system, the second signal comprising a command to change the identification code of the light source, the command being received by the driver system in response to a determination by a server that the identification code of the light source is to change from a first ID code to a second ID code and transmitting by the server, in response to the determination, a first signal to the mobile devices, the first signal comprising the command to change the identification code of the light source.

11. A driver system according to claim 10, wherein the control unit is further configured to transmit a confirmation signal using modulation of the light source after successfully changing the identification code of the light source.

12. A visible light communication system comprising:

a light source;

a driver system;

a server; and a mobile device, wherein the driver system is configured to drive the light source such that the light source emits a modulated light comprising at least an identification code associated with the light source, wherein the mobile device is configured to receive the identification code from the light source to identify the light source, and wherein the server is configured to allow the mobile device to identify the light source, and to initiate a change of the identification code of the light source by sending a first signal comprising a corresponding command to the mobile device, and to update the identification code of the light source upon receiving a confirmation of the changed identification code from the mobile device, wherein the mobile device is further configured to receive from the server the first signal comprising the command to change the identification code of the light source, to relay to the driver system the command to change the identification code of the light source by sending a second signal comprising the command to change the identification code of the light source, after the network adapter of the first mobile device receives from the server the first signal comprising the command to change the identification code of the light source, to receive a confirmation of the change of the identification code from the driver system, and to relay the confirmation to the server, and wherein the driver system is further configured to receive the second signal comprising the command to change the identification code of the light source from the mobile device, to change the identification code accordingly, and to send the confirmation to the mobile device.

13. The visible light communication system according to claim 12, wherein the server is configured to transmit the first signal comprising the command to change the identification code of the light source from the first ID code to the second ID code to at least two mobile devices, wherein a first one of the at least two mobile devices that establishes a connection with the light source after receiving the first signal comprising the command to change the identification code of the light source from the first ID code to the second ID code, is the first mobile device, and transmits to the light source the second signal comprising the command to change the identification code of the light source from the first ID code to the second ID code.

14. The visible light communication system according to claim 13, wherein the at least two mobile devices include at least one of a smartphone, a tablet, or an electronic device of a user that may move through a space illuminated by the light source.

15. The visible light communication system according to claim 12, wherein information relating to the light source and a coupling between the second ID code and the light source are stored on the server, wherein the server is configured to send the information relating to the light source to the first mobile device, and wherein the first mobile device is configured to, in response to the first mobile device receiving the second ID code from the light source, identify the light source by means of the second ID code, and use the information relating to the light source for interaction with the user of the first mobile device.

16. The visible light communication system according to claim 15, wherein the server is configured to send the information relating to the light source and associated with the second ID code to the first mobile device in response to the first mobile device receiving, from the light source, the second ID code and the first mobile device requesting the server to send the information relating to the light source and associated with the second ID code.

17. The visible light communication system according to claim 15, wherein server is configured to load the information relating to the light source and associated with the second ID code into the first mobile device, prior to the first mobile device receiving, from the light source, the second ID code.

\* \* \* \* \*